US009819708B2

(12) United States Patent
Shelton et al.

(10) Patent No.: US 9,819,708 B2
(45) Date of Patent: Nov. 14, 2017

(54) METHOD AND SYSTEM FOR SELF-REGISTRATION AND SELF-ASSEMBLY OF ELECTRICAL DEVICES

(71) Applicant: The AES Corporation, Arlington, VA (US)

(72) Inventors: John C. Shelton, Vienna, VA (US); Brett Galura, Falls Church, VA (US); Jay Geinzer, Glenwood, MD (US); Isaiah Jefferson, Mitchellville, MD (US); Wells Case Jacobson, Jr., Washington, DC (US)

(73) Assignee: THE AES CORPORATION, Arlington, VA (US)

( * ) Notice: Subject to any disclaimer, the term of this patent is extended or adjusted under 35 U.S.C. 154(b) by 137 days.

(21) Appl. No.: 14/721,533

(22) Filed: May 26, 2015

(65) Prior Publication Data
US 2016/0352786 A1 Dec. 1, 2016

(51) Int. Cl.
H04L 29/06 (2006.01)
H02J 3/14 (2006.01)
H02J 7/00 (2006.01)

(52) U.S. Cl.
CPC ........... *H04L 65/1073* (2013.01); *H02J 3/14* (2013.01); *H02J 7/007* (2013.01); *Y02B 70/3225* (2013.01);
(Continued)

(58) Field of Classification Search
USPC ............... 709/203, 223, 249; 701/408, 522
See application file for complete search history.

(56) References Cited

U.S. PATENT DOCUMENTS 6,567,574 B1 * 5/2003 Ma ..................... H04Q 11/0005
385/16
7,330,897 B2 * 2/2008 Baldwin ................. H04L 41/12
707/999.01
(Continued)

FOREIGN PATENT DOCUMENTS

EP 2 797 206 A1 10/2014
WO WO 2014/117212 A1 8/2014

OTHER PUBLICATIONS

Oct. 18, 2016 European extended Search Report issued in European Patent Office in European Application No. 16171174.2.
(Continued)

Primary Examiner — Jude Jean Gilles
(74) Attorney, Agent, or Firm — Buchanan Ingersoll & Rooney PC

(57) ABSTRACT

A method for self-registration and/or self-assembly of a plurality of electrical devices, the method including: performing the self-registration of the plurality of electrical devices by sending, from each of the plurality of electrical devices, device information that is stored in each of the plurality of electrical devices to a control device, including a processor, via a network, wherein the device information of each device identifies unique characteristics of the device the device information is stored in; receiving, in the control device, the device information sent from each of the plurality of electrical devices; storing, in a memory of the control device, the device information of each of the plurality of electrical devices; and determining, from the stored device information of each of the plurality of electrical devices that each of the plurality of electrical devices are present and available on the network.

26 Claims, 11 Drawing Sheets

(52) U.S. Cl.
CPC .......... *Y02B 70/3266* (2013.01); *Y04S 20/222* (2013.01); *Y04S 20/242* (2013.01)

(56) References Cited

U.S. PATENT DOCUMENTS

| | | | |
|---|---|---|---|
| 8,008,804 B2* | 8/2011 | Capp | H02J 3/30 |
| | | | 307/44 |
| 8,429,435 B1 | 4/2013 | Clayton et al. | |
| 2003/0036204 A1* | 2/2003 | Stark | A61K 31/428 |
| | | | 436/172 |
| 2010/0005212 A1* | 1/2010 | Gower | G06F 13/4234 |
| | | | 710/308 |
| 2013/0035802 A1 | 2/2013 | Khaitan et al. | |
| 2013/0191055 A1 | 7/2013 | Itogawa | |
| 2013/0303085 A1* | 11/2013 | Boucher | H04W 4/008 |
| | | | 455/41.1 |
| 2014/0211743 A1 | 7/2014 | Nakano et al. | |
| 2014/0244819 A1* | 8/2014 | Patrick | H04L 41/0806 |
| | | | 709/223 |
| 2015/0270743 A1* | 9/2015 | Orthlieb | H02J 3/00 |
| | | | 165/288 |

OTHER PUBLICATIONS

Chilean Office Action "Informe Pericial Sobre Solicitud de Patente de Invención" dated Aug. 14, 2017, by the Chilean Patent Office in corresponding Chilean Patent Application No. 2016-01270 (11 pages).

* cited by examiner

METHOD AND SYSTEM FOR SELF-REGISTRATION AND SELF-ASSEMBLY OF ELECTRICAL DEVICES

CROSS-REFERENCE TO RELATED APPLICATIONS

The entire contents of related application entitled "Automated Robotic Battery Tug," Ser. No. 14/721,522, and related application entitled "Modular Energy Storage Method and System," Ser. No. 14/721,582, are both incorporated by reference herein.

BACKGROUND

The present disclosure is directed to a method and system for self-registration and self-assembly of separate electrical devices into a hierarchical computer architecture. The electrical devices may be energy storage devices, and the energy storage devices can self-assemble into a dynamically scalable storage system that can be used in an energy storage facility. The energy that is stored in the energy storage devices that are assembled into the storage system can be used in a variety of different scenarios, including applications such as peak-shaving, emergency power, and system stability control with duty cycles ranging from seconds to several hours.

SUMMARY

A method for self-registration and/or self-assembly of a plurality of electrical devices, the method including: performing the self-registration of the plurality of electrical devices by sending, from each of the plurality of electrical devices, device information that is stored in each of the plurality of electrical devices to a control device, including a processor, via a network, wherein the device information of each device identifies unique characteristics of the device the device information is stored in; receiving, in the control device, the device information sent from each of the plurality of electrical devices; storing, in a memory of the control device, the device information of each of the plurality of electrical devices; and determining, from the stored device information of each of the plurality of electrical devices that each of the plurality of electrical devices are present and available on the network.

A method for self-registration and/or self-assembly of a plurality of electrical devices, the method including: performing the self-registration of the plurality of electrical devices, with control logic distributed among more than two of the plurality of electrical devices, by determining which of the plurality of electrical devices are present and available; and instructing, by the control logic, at least two electrical devices that are determined to be present and available to assemble into a functional unit.

These and other features and advantages of particular embodiments of the rack based unit energy storage method and system will now be described by way of exemplary embodiments to which they are not limited.

BRIEF DESCRIPTION OF THE DRAWINGS

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

This description provides exemplary embodiments only, and is not intended to limit the scope, applicability or configuration of the method and system for self-registration and/or self-assembly. Rather, the ensuing description of the embodiments will provide those skilled in the art with an enabling description for implementing embodiments of the method for self-registration and self-assembly of electrical devices. Various changes may be made in the function and arrangement of elements without departing from the spirit and scope of the system and method as set forth in the appended claims. Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

Figure 1:
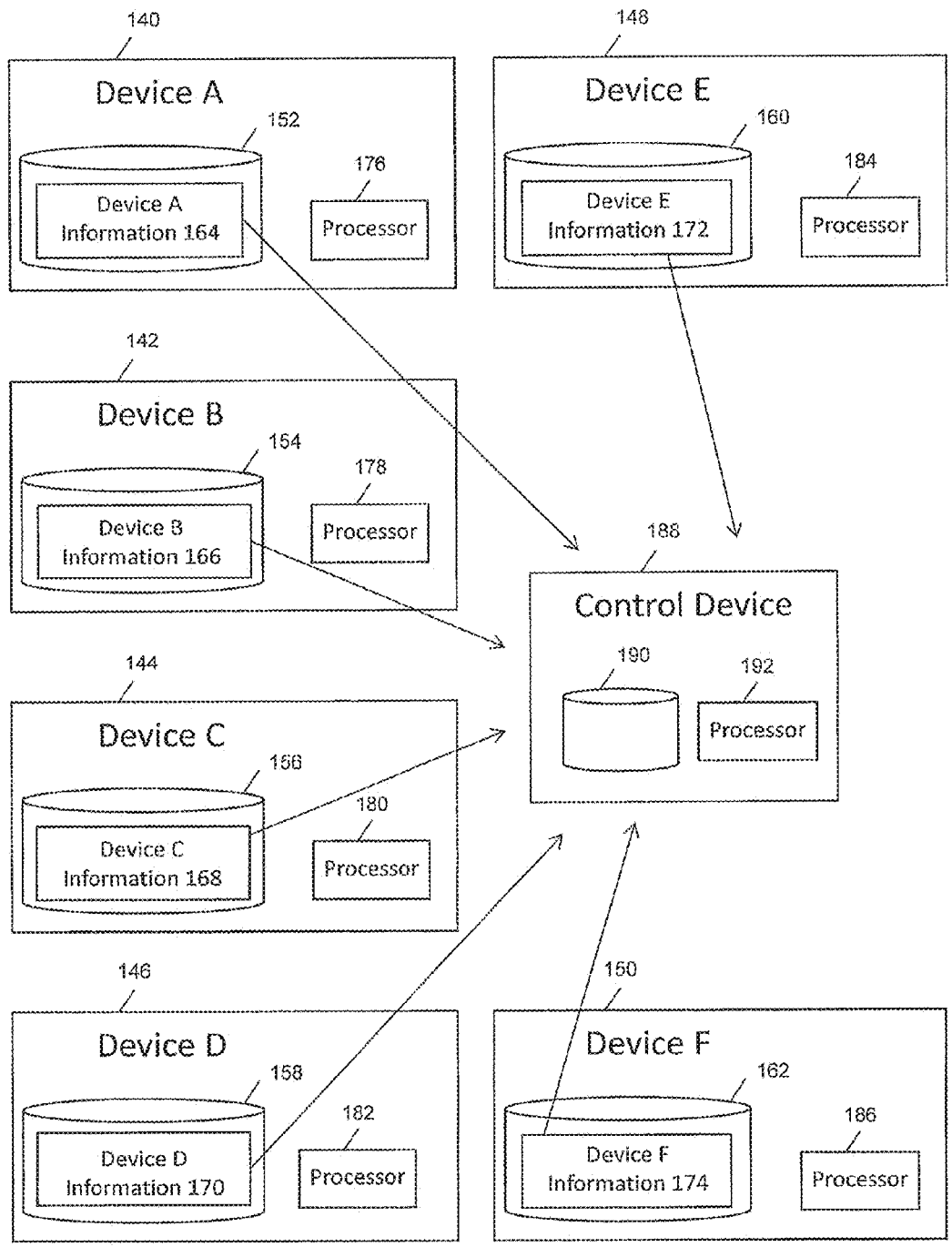
FIG. 1 illustrates a hardware architecture in accordance with an exemplary embodiment.

FIG. 1 shows an exemplary embodiment in which a plurality of electrical devices 140, 142, 144, 146, 148, 150 can self-register with a control device 188. FIG. 1 shows six electrical devices, but any number of electrical devices can self-register with the control device 188. The control device 188 can also be the same device as the electrical devices 140, 142, 144, 146, 148, 150 or a different device. Also, the electrical devices 140, 142, 144, 146, 148, 150 can all be the same devices or different devices.

Each of the electrical devices 140, 142, 144, 146, 148, 150 contains device information 164, 166, 168, 170, 172, 174 stored in computer-readable storage mediums 152, 154, 156, 158, 160, 162, respectively. The computer-readable storage mediums can be any type of memory device (e.g., RAM, ROM, hard drive, optical drive, etc.). The device information that is stored in each of the electrical devices is unique to each electrical device and is a minimum set of information that uniquely identifies the electrical device. The device information can also contain information about the capabilities or characteristics (e.g., specifications such as operating voltage, amperage and power, identifier, age/install date, optimal use parameters, manufacture information, battery/energy storage device information, etc.) of the electrical device. The electrical devices 140, 142, 144, 146, 148, 150 can be any type of electrical device that includes at a minimum a processor and a memory.

Figure 3:
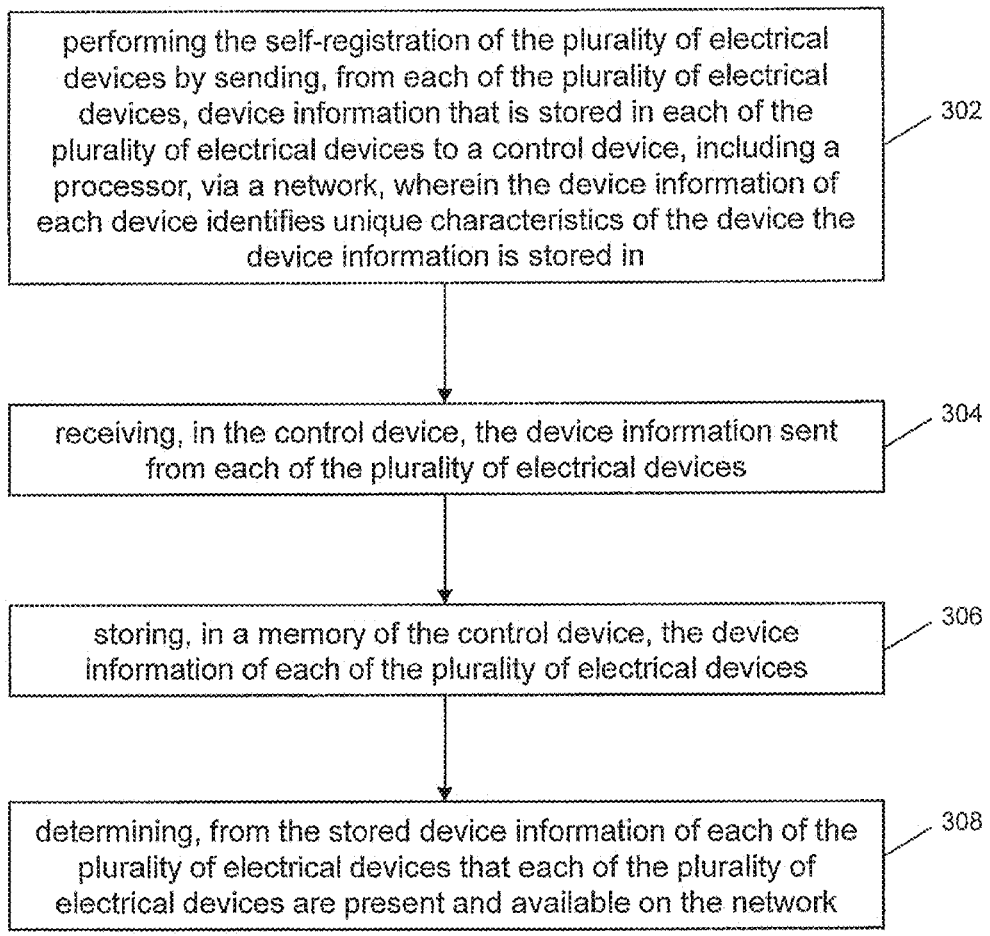
FIG. 3 illustrates a method performed in accordance with an exemplary embodiment.

In an exemplary embodiment of self-registration shown in FIGS. 1 and 3, the self-registration of the plurality of electrical devices 140, 142, 144, 146, 148, 150 is performed by sending, from each or some of the plurality of electrical devices 140, 142, 144, 146, 148, 150, device information 164, 166, 168, 170, 172, 174 that is stored in each of the plurality of electrical devices 140, 142, 144, 146, 148, 150 to a control device 188, including a computer processor 192 (e.g., CPU), via a network (e.g., wireless or wired computer network). The device information of each electrical device identifies unique characteristics of the device the device information 164, 166, 168, 170, 172, 174 is stored in (See step 302). For example, if the electrical devices are power storage devices, the unique characteristics contained in the device information could be the battery or energy storage device type, the charge state of the batteries or energy storage devices, current power available, total power available at full charge, current available, voltage available, battery or energy storage device charge/discharge history, etc.

In an exemplary embodiment, the control device 188 receives the device information 164, 166, 168, 170, 172, 174 sent from each of the plurality of electrical devices 140, 142, 144, 146, 148, 150 (See step 304). Then the control device 188 stores, in a memory 190 of the control device 188, the device information 164, 166, 168, 170, 172, 174 of each of the plurality of electrical devices 140, 142, 144, 146, 148, 150 (See step 306). The control device 188 then determines, from the stored device information 164, 166, 168, 180, 172, 174 of each of the plurality of electrical devices 140, 142, 144, 146, 148, 150 that each of the plurality of electrical devices 140, 142, 144, 146, 148, 150 are present and available on the network (See step 308).

In an exemplary embodiment, the control device 188 selects at least two electrical devices among the plurality of electrical devices based on each of the two electrical device's characteristics that are stored in their device information. For example, the control device 188 could select electrical device 140 based on its device information 164 and select electrical device 142 based on its device information 166. In an exemplary embodiment, the at least two assembled electrical devices are organized in a hierarchical manner so that one or more of the assembled electrical devices has greater influence/control over the assembled electrical devices. In an exemplary embodiment, the assembled electrical devices that are lower in the hierarchy report their operating status and/or other parameters to the one or more assembled electrical devices that are higher in the hierarchy.

In an exemplary embodiment, the control device 188 can transmit instructions, from the control device 188 to the at least two electrical devices (in the example above electrical devices 140 and 142), instructing the at least two electrical devices to assemble into a functional unit, i.e., the two electrical devices can connect to each other or communicate with each other, and can use each other's resources to function as a single cohesive unit or device.

In an exemplary embodiment, after the instructions are transmitted, the at least two electrical devices assemble themselves (i.e., self-assembly) into the cohesive unit or device (i.e., the assembled electrical devices form a functional unit) or system architecture to achieve a defined function or set of functions. Assembly may include the opening of communications pathways between the at least two electrical devices or may involve additional configuration changes.

In an exemplary embodiment, after a plurality of electrical devices are self-registered, a first group of electrical devices among the plurality of electrical devices is formed based on a first characteristic that is shared by the first group of electrical devices, and a second group of electrical devices among the plurality of electrical devices is formed based on a second characteristic that is shared by the second group of electrical devices. Any number of groups can be formed, and the number of groups is not limited to two. After the groups are formed, either the first group of electrical devices or the second group of electrical devices is used based on whether the first characteristic or the second characteristic is desired. For example, when the electrical devices are energy storage devices, stored energy is received from either the first group of electrical devices or the second group of electrical devices based on whether the first characteristic or the second characteristic is desired.

In addition, in an exemplary embodiment, the control device 188 is at least one of the plurality of electrical devices and is not a separate device. In an exemplary embodiment, the functions that would have been handled by the control device 188 and the logic (e.g., control logic) that would have been present in the control device 188 are distributed/shared among some or all of the plurality of electrical devices.

In an exemplary embodiment, a method for self-registration and/or self-assembly of a plurality of electrical devices 140, 142, etc. is executed by: 1) performing the self-registration of the plurality of electrical devices 140, 142, 144, 146, 148, 150, with control logic distributed among more than two of the plurality of electrical devices, by determining which of the plurality of electrical devices 140, 142, 144, 146, 148, 150 are present and available; and 2) instructing, by the control logic, at least two electrical devices that are determined to be present and available to assemble into a functional unit.

FIGS. 2A-2F illustrate exemplary embodiments of self-registration and self-assembly of a plurality of electrical devices 140, 142, 144, 146, 148, 150. As mentioned above, FIGS. 2A-2F show six electrical devices, but there could be virtually any number of devices or types of devices within the capability of the selected hardware and software, but scaleable. Also, the control device 188 could be a device that is different from the plurality of electrical devices 140, 142, 144, 146, 148, 150 or could be the same device as one or all of the plurality of electrical devices 140, 142, 144, 146, 148, 150. Also, as described above, the control device 188 does not need to be present and the control logic can be distributed among the electrical devices that are assembled into a functional entity (e.g., in FIG. 2A the control logic can be present in one of electrical devices 140, 142, 144 or distributed among some or all of the electrical devices 140, 142, 144). In an exemplary embodiment, the control device 188 is not present and the control logic is distributed among the electrical devices that are registered (e.g., in FIG. 2A the control logic can be present in one of electrical devices 140, 142, 144, 146, 148, 150 or distributed among some or all of electrical devices 140, 142, 144, 146, 148, 150).

Figure 2A:
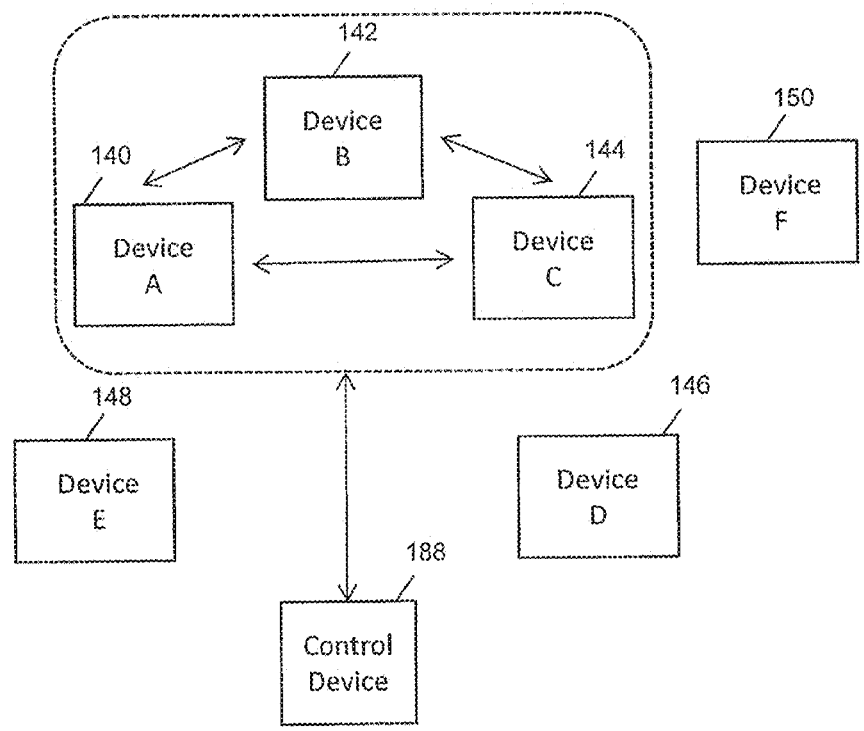
FIGS. 2A-2F illustrate hardware architectures in accordance with exemplary embodiments.

In an exemplary embodiment shown in FIG. 2A, after all or some of the electrical devices 140, 142, 144, 146, 148, 150 have self-registered with the control device 188, the control device 188 sends instructions over the network for electrical devices 140, 142, and 144 to self-assemble into one functional entity. The dotted line shown in FIG. 2A indicates that electrical devices 140, 142, and 144 are assembled and are working as a single entity, whereas electrical devices 146, 148, and 150 are not connected to devices 140, 142, and 144. However, electrical devices 146, 148, and 150 can still communicate with the control device 188.

Figure 2B:
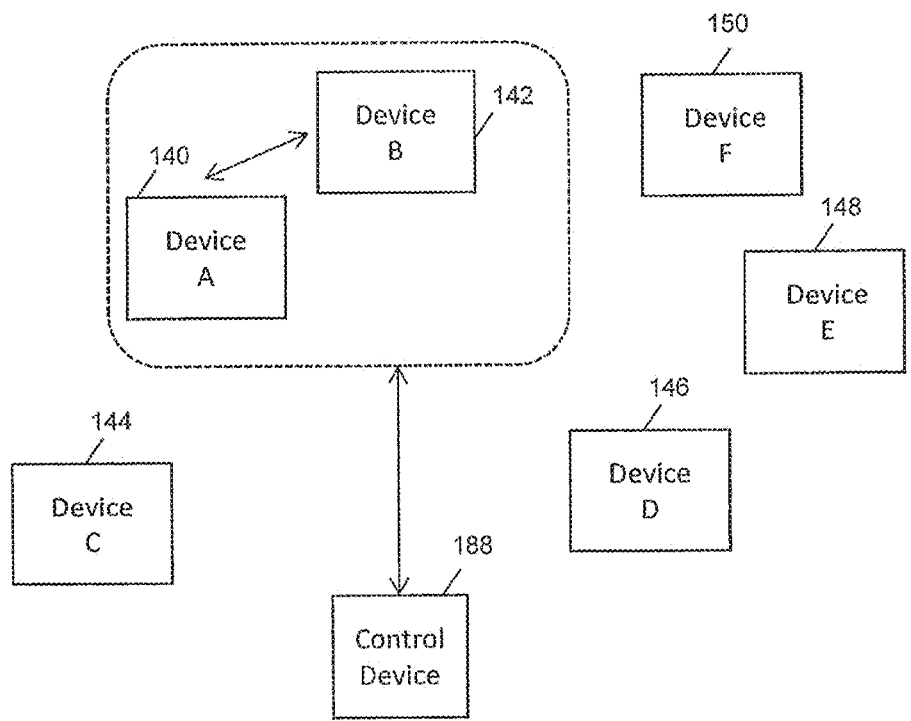

In an exemplary embodiment shown in FIG. 2B, after all or some of the electrical devices 140, 142, 144, 146, 148, 150 have self-registered with the control device, the control device 188 sends instructions over the network for electrical devices 140 and 142 to self-assemble into one functional entity. The dotted line shown in FIG. 2B indicates that electrical devices 140 and 142 are assembled and are working as a single entity, whereas electrical devices 144, 146, 148, and 150 are not connected to devices 140 and 142. However, electrical devices 144, 146, 148, and 150 can still communicate with the control device 188.

Figure 2C:
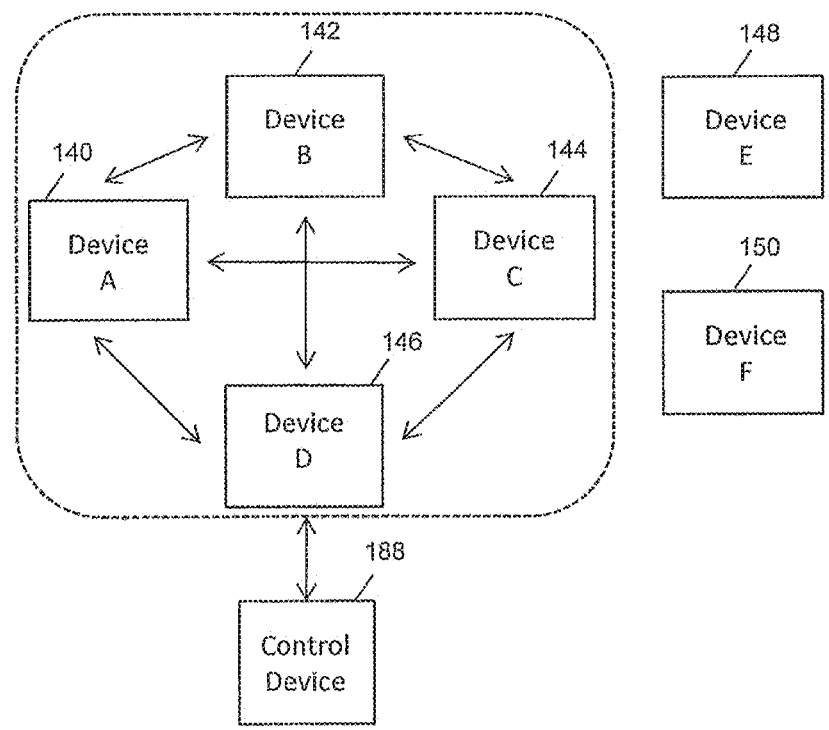

In an exemplary embodiment shown in FIG. 2C, after all or some of the electrical devices 140, 142, 144, 146, 148, 150 have self-registered with the control device, the control device 188 sends instructions over the network for electrical devices 140, 142, 144, and 146 to self-assemble into one functional entity. The dotted line shown in FIG. 2C indicates that electrical devices 140, 142, 144, and 146 are assembled and are working as a single entity, whereas electrical devices 148 and 150 are not connected to devices 140, 142, 144, and 146. However, electrical devices 148 and 150 can still communicate with the control device 188.

Figure 2D:
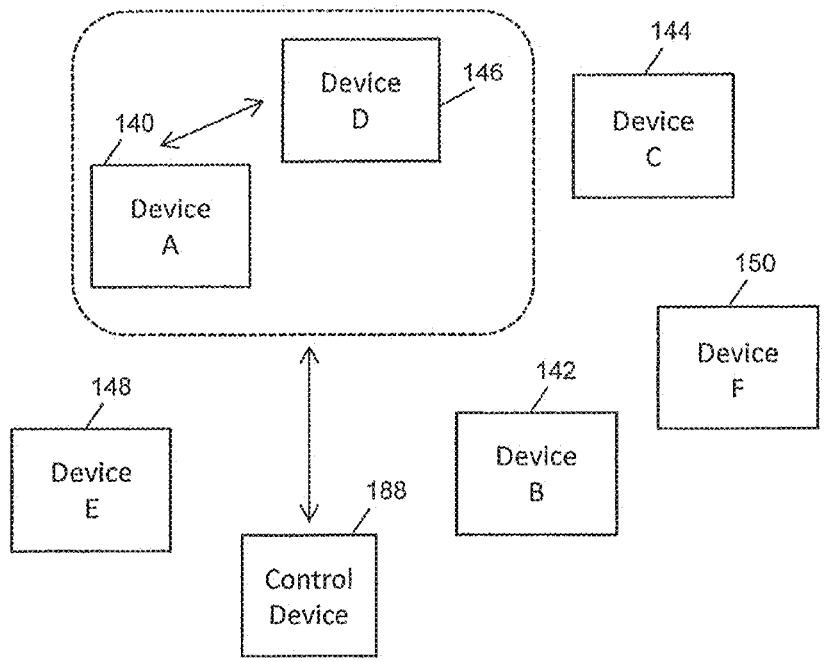

In an exemplary embodiment shown in FIG. 2D, after all or some of the electrical devices 140, 142, 144, 146, 148, 150 have self-registered with the control device, the control device 188 sends instructions over the network for electrical devices 140 and 146 to self-assemble into one functional entity. The dotted line shown in FIG. 2D indicates that electrical devices 140 and 146 are assembled and are working as a single entity, whereas electrical devices 142, 144, 148, and 150 are not connected to devices 140 and 146. However, electrical devices 142, 144, 148, and 150 can still communicate with the control device 188.

Figure 2E:
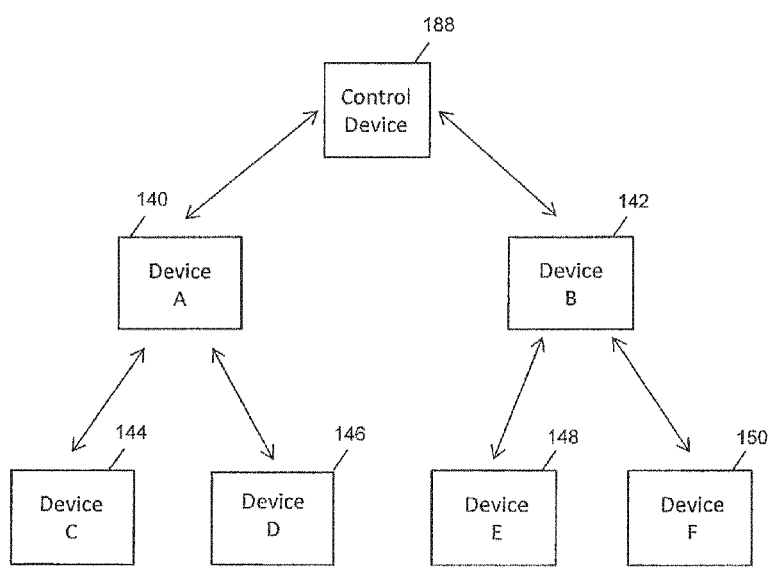

In an exemplary embodiment shown in FIG. 2E, after all or some of the electrical devices 140, 142, 144, 146, 148, 150 have self-registered with the control device 188, the control device 188 sends instructions over the network for electrical devices 140, 142, 144, 146, 148, 150 to self-assemble into one functional entity. In FIG. 2E, the electrical devices 140, 142, 144, 146, 148, 150 are self-assembled into a hierarchical tree-like structure. The electrical devices 140, 142, 144, 146, 148, 150 can be self-assembled into another structure (hierarchical or non-hierarchical). In the exemplary structure shown in FIG. 2E, the control device 188 is located at the highest level of the hierarchy, and monitors and communicates with electrical devices 140 and 142. Electrical devices 140 and 142 are located at the second-highest level of the hierarchy, and the electrical device 140 monitors/communicates with electrical devices 144 and 146 (located at the lowest level of the hierarchy). Electrical device 142 monitors/communicates with electrical devices 148 and 150 (also located at the lowest level of the hierarchy).

In the exemplary arrangement shown in FIG. 2E, electrical devices 140, 144, and 146 can comprise one functioning unit or subunit and electrical devices 142, 148, and 150 comprise a separate functioning unit or subunit. The control device 188 is then connected to the unit or subunit comprised of electrical devices 140, 144, and 146 and the unit or subunit comprised of electrical devices 142, 148, and 150 to create an entire system made up of control device 188 and the two units/subunits made up of electrical devices 140, 144, and 146 and electrical devices 142, 148, and 150. FIG. 2E shows a hierarchy of three levels with a total of seven devices. However, any number of devices, levels, and combinations are possible.

Figure 2F:
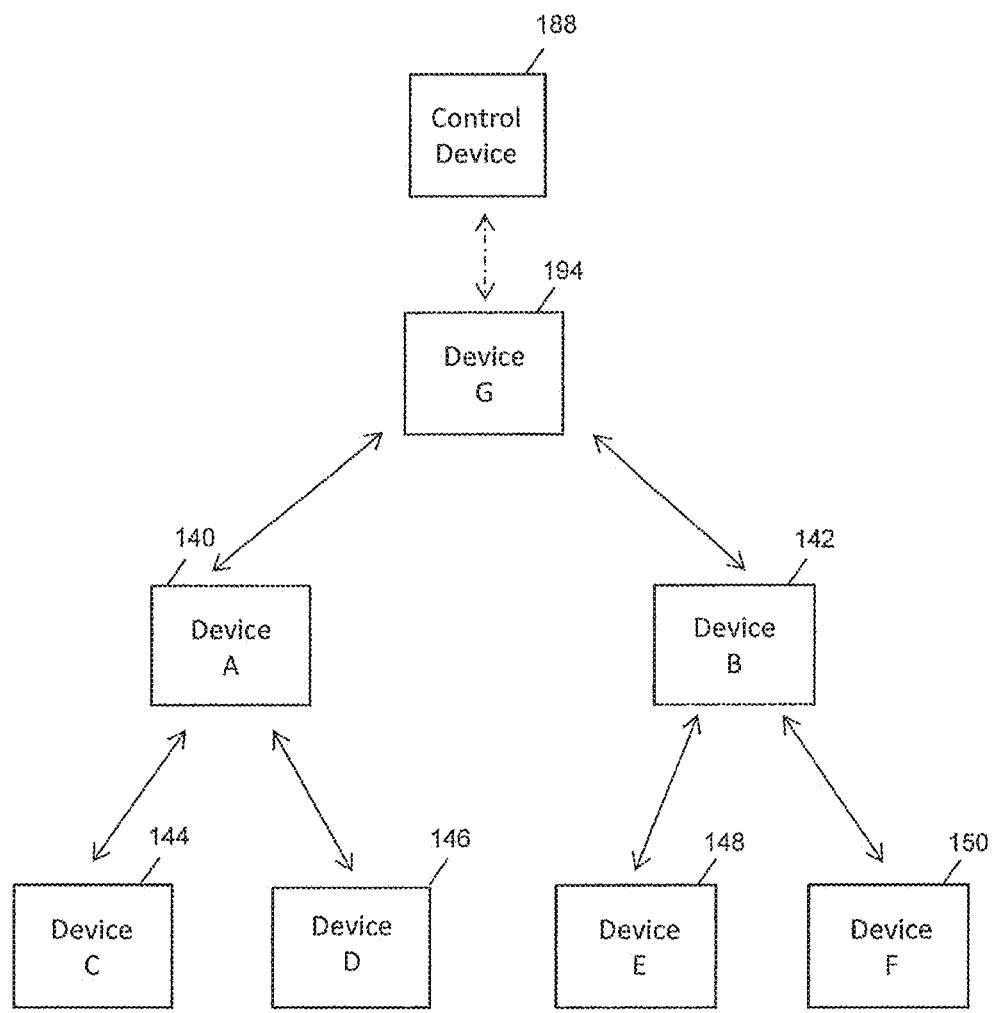

FIG. 2F shows an exemplary embodiment that is similar to FIG. 2E, except that control device 188 in FIG. 2E is replaced with another electrical device 194, and a control device 188 may or may not be present at a level above the electrical device 194. FIG. 2F shows a hierarchy of three (or four) levels with a total of seven (or eight) devices. However, any number of devices, levels, and combinations are also possible.

In an exemplary embodiment, at least one electrical device among the plurality of electrical devices that are registered can be deregistered. For example, all of the plurality of electrical devices may not be necessary, or an electrical device can be deregistered if it is not functioning properly, etc. The at least one electrical device can deregister itself, or it can be deregistered by a signal being sent by another device.

Figure 4:
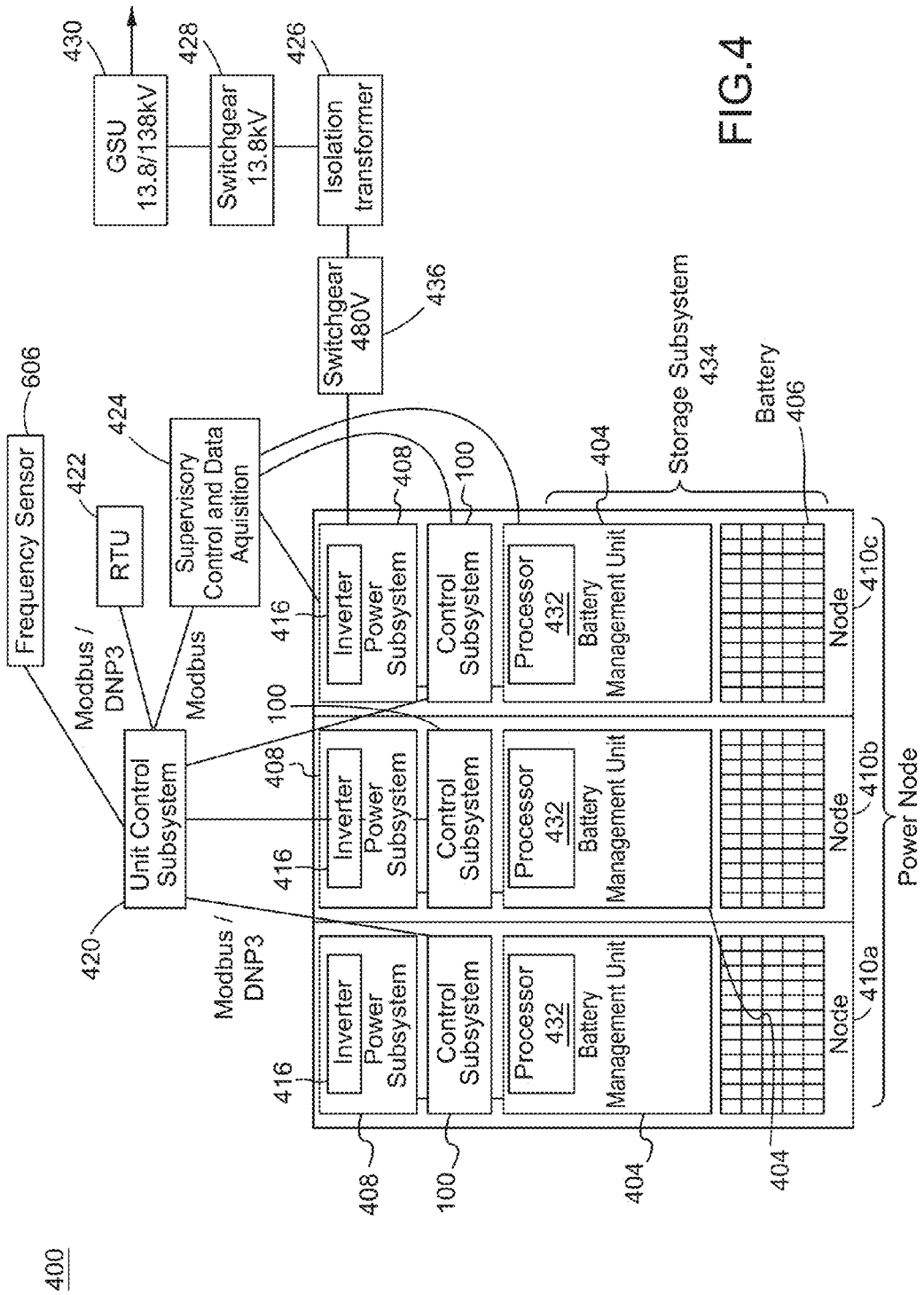
FIG. 4 illustrates a power system architecture in accordance with an exemplary embodiment.

In an exemplary embodiment, each of the plurality of electrical devices can be a device for storing or managing electrical power. In an exemplary embodiment, the electrical devices for storing and managing electrical power used in the method and system for self-registration and self-assembly are the devices described in Ser. No. 14/721,582, entitled "Modular Energy Storage Method and System. For example, the electrical devices can each contain one or more energy storage devices (e.g., batteries, capacitors, etc.) for the storage of electrical power. For example, one or more of the electrical devices can be a storage subsystem 434, shown in FIG. 4, which stores power. In FIG. 4, an exemplary storage subsystem 434 includes an energy storage device unit/battery management unit 404 that can include a processor device 432, a memory device, and a sensor device. Additional details of the architecture of the storage subsystem 434 will be explained later below.

In an exemplary embodiment, the various electrical devices can self-assemble based on an amount of power and/or power characteristics that are needed for a power system. The created power system is then dynamically scalable based on power requirements by adjusting the amount of electrical devices that are connected to each other (e.g. total number of electrical devices) and their configuration (e.g., levels in a hierarchical tree structure, etc.). In an exemplary embodiment, at least one electrical device of the plurality of electrical devices can be a power subsystem 408 that converts power. As shown in FIG. 4, the power subsystem 408 can include, for example, an inverter 416.

FIG. 4 illustrates a power node system that includes three node systems 410a, 410b, 410c. Each node system 410a, 410b, 410c, is a node of power (i.e., stores power). The multiple nodes 410a, 410b, 410c form a unit or entity which will hereinafter be referred to as a power node. Any number of nodes could be used in the power node system of FIG. 4, as the system is scalable from one to hundreds or thousands of parallel nodes 410a, 410b, 410c, etc. Each node 410a can include: a storage rack or other container configured to securely hold a control subsystem 100, a power subsystem 408, and a storage subsystem 434 that includes one or more energy storage devices 406 which are removable and chargeable.

Thus, due to the modularity of the components in the node, there is a physical and logical separation, and independence of the components. Due to the scalability of the power system, there can be separate scaling of power and duration characteristics. Also, the size of the power system can be easily adapted based on project requirements and business changes. The modularity eliminates a single point of failure, and minimizes on site construction as the components can have plug and play capability.

In an exemplary embodiment shown in FIG. 4, the electrical devices shown in FIGS. 1 and 2A-2F can be nodes 410 or similar to nodes 410. Each node 410, for example node 410a, includes a power subsystem 408, a control subsystem 100, and a storage subsystem 434. In an exemplary embodiment shown in FIG. 4, the storage subsystem 434 includes one or more energy storage devices 406 which are removable and chargeable, and a processor 432 that is configured to monitor at least one energy storage device of the one or more energy storage devices 406.

If the energy storage devices in the storage subsystem 434 are batteries 406, the storage subsystem 434 can include batteries from different manufacturers or they can all be from the same manufacturer. Also, the batteries can all be of the same type (e.g. NiCd) or can be of different types. The storage subsystem 434 includes an energy storage device unit/battery management unit 404 including a computer processor 432 that is configured to monitor at least one energy storage device of the one or more energy storage devices 406 in the storage subsystem 434, and the energy storage device unit/battery management unit 404 is configured to communicate with the control subsystem 100. In an exemplary embodiment, the energy storage device unit/battery management unit 404 contains computer-based electronics and firmware responsible for safe charging/discharging of all batteries or energy storage devices and communicates with the control subsystem 100.

The power storage and distribution system 400 shown in FIG. 4 also includes a unit control subsystem 420 that is connected to each of the three nodes 410a, 410b, and 410c. In other words, the control subsystem 100 of each node 410a, 410b, 410c is connected to the unit control subsystem 420. The unit control subsystem 420 serves an arbitrary number of nodes. For example, the unit control subsystem 420 is configured to monitor a current state of the plurality of nodes 410a, 410b, 410c in the power storage and distribution system 400 shown in FIG. 4. The unit control subsystem 420 monitors/maintains, for example, the current state and charge/discharge capacity for the group of nodes it is assigned to cover. Any number of nodes can be used in the power storage and distribution system 400 shown in FIG. 4. Communications between the control subsystems 100 of nodes and the unit control subsystem 420 can be, for example, via Modbus or DNP3. Modbus is a serial communications protocol that is used to connect industrial electronic devices. Modbus allows for communication between many devices connected to the same network.

In the power storage and distribution system 400 of FIG. 4, the unit control subsystem 420 is configured to monitor a charge/discharge capacity of the plurality of nodes 410a, 410b, 410c, etc. The unit control subsystem 420 is also configured to optimize health and performance of the storage subsystems 434, the power subsystems 408, and/or the control subsystems 100 in the plurality of nodes 410a, 410b, 410c, etc. using, for example, the status/health/performance parameters described above. Also, the control subsystems 100 of each node can send a cost curve (e.g., Kilowatts vs. dollars) to the unit control subsystem 420, and the unit control subsystem 420 can determine which node is the cheapest resource to use, and use the power stored in the node that is the cheapest resource of power. In other words, the unit control subsystem 420 can bid between nodes in order to determine which node or nodes are the cheapest resource/resources of stored power. In an exemplary embodiment, the unit control subsystem 420 can rank the plurality of nodes based on their cost curve (e.g. cheapest to most expensive or most expensive to cheapest).

As described above, in each node 410a, 410b, 410c, the energy storage device unit/battery management unit 404 includes a processor 432 that is configured to monitor at least one energy storage device 406 (e.g., battery, capacitor, etc.), and is configured to communicate with the control subsystem 100. Also, in each node, the power subsystem 408 is configured to be connected to a power line, and the power subsystem 408 includes a power converter 416 (e.g. an inverter) which converts AC power to DC power when the at least one energy storage device 406 is charged, and converts DC power to AC power when the at least one energy storage device is discharged.

In each node 410a, 410b, 410c, the control subsystem 100 of the rack is connected to the storage subsystem 434 of the node and is connected to the power subsystem 408 of the node. The control subsystem 100 of the node includes a processor 102, and the processor 102 is configured to control transferring of power between the storage subsystem 434 and the power subsystem 408. In an exemplary embodiment, the processor 102 of the node is configured to send signals which control the charging and discharging of the at least one energy storage device 406 in the node, and the processor 102 is configured to monitor an operational status of one or more energy storage devices 406 in the node.

The power storage and distribution system 400 of FIG. 4 includes, for example, a frequency sensor 606, an RTU 422, and a supervisory control and data acquisition (SCADA) module 424 that is connected to the unit control subsystem 420. The frequency sensor 606 could be a voltage sensor, etc. The SCADA module 424 is a control system that performs data acquisition and is the primary user interface to the node control subsystems 410d, 410e, etc., the unit control subsystems 602a, 602b, etc., the site control subsystem 604, and a market dispatch unit. As shown in FIG. 4, SCADA module 424 can send and/or receive data from the power subsystem 408, the control subsystem 100 and the storage subsystem 434 of node 410c. SCADA module 424 can also send and/or receive data from all of the subsystems 100, 408, 434 in nodes 410a and 410b. That is, the SCADA module 424 can talk to each subsystem separately. The market dispatch unit contains market intelligence (e.g. power costs, etc.) and can make intelligent decisions based on market information pertaining to the energy industry. Communications between the unit control subsystem 420 and the RTU 422 and the SCADA module 424 can be, for example, via Modbus or DNP3. All data points of the site control subsystem 604, the unit control subsystems 420, 602a, 602b, 602c, and the node control subsystems 410a, 410b, 410c are available to the SCADA module 424.

The nodes 410a, 410b, 410c are connected to a switchgear 436 of, for example, 480V. Specifically, the switchgear 436 can be connected to the power subsystems 408 of the nodes 410a, 410b, 410c. In FIG. 4, the switchgear 436 is connected to an isolation transformer 426. The isolation transformer 426 is connected to a switchgear 428 of, for example, 13.8 kV. The switchgear 428 can also be connected to a generator step-up (GSU) transformer 430. The GSU transformer 430 can be for example, a 13.8/138 kV GSU transformer.

Figure 8:
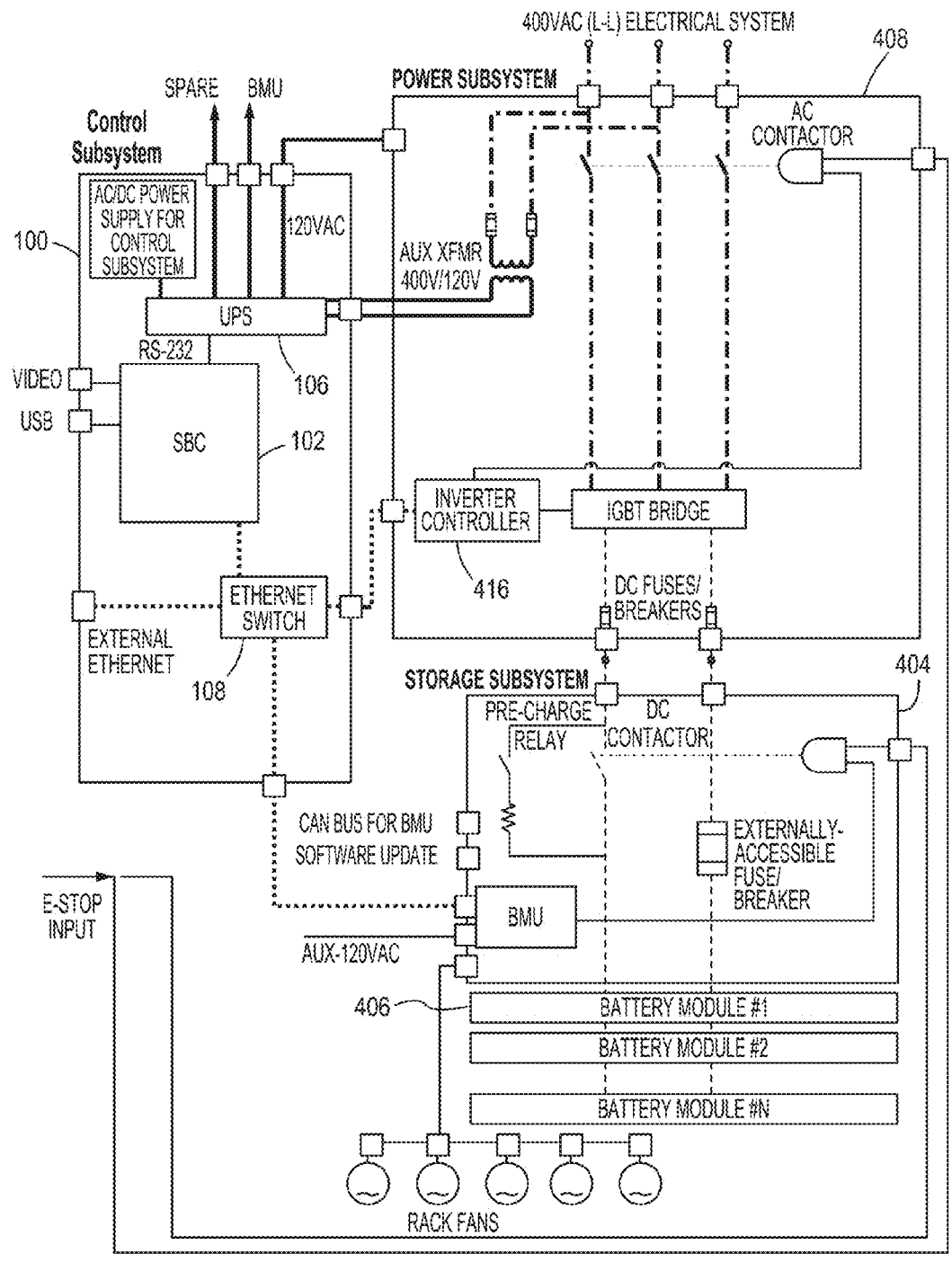
FIG. 8 illustrates interconnections of components in a node in accordance with an exemplary embodiment.

In FIG. 4, the power subsystem 408 can be configured to be connected to a power line. For example, FIG. 8 shows that the power subsystem 408 is connected to, for example, a 400V AC line-to-line electrical system. The line-to-line electrical system could have any other voltage amount. The power subsystem 408 includes a power converter (e.g. an inverter) 416 which converts AC power to DC power when at least one energy storage device 406 is being charged, and converts DC power to AC power when at least one energy storage device is being discharged.

Figure 7:
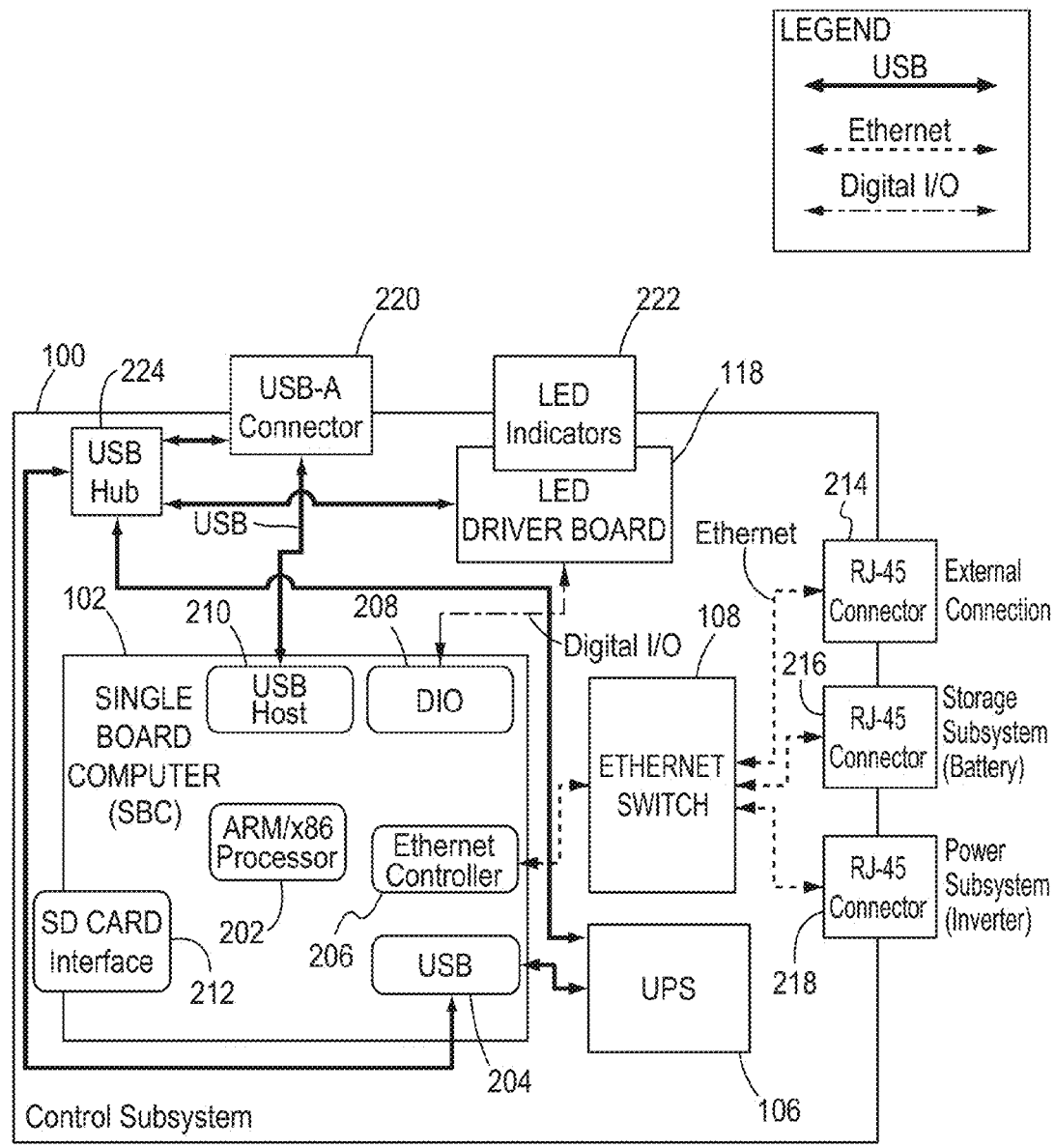
FIG. 7 illustrates a hardware architecture of the control subsystem in accordance with an exemplary embodiment.

In FIGS. 4 and 8, the control subsystem 100 is connected to the storage subsystem 434 and is connected to the power subsystem 408. As shown in FIG. 7, the control subsystem 100 includes a processor 102, and the processor 102 is configured to control the transferring of power between the storage subsystem 434 and the power subsystem 408. FIG. 8 shows that the energy storage device unit/battery management unit 404 is electrically connected in between the power subsystem 408 and the battery/energy storage device modules 406.

In an exemplary embodiment, the processor 102 of the control subsystem 100 is configured to send signals which control the charging and discharging of at least one energy storage device 406 located in the storage subsystem 434. Also, the processor 102 is configured to monitor an operational status of one or more energy storage devices 406 located in the storage subsystem 434.

Figure 6:
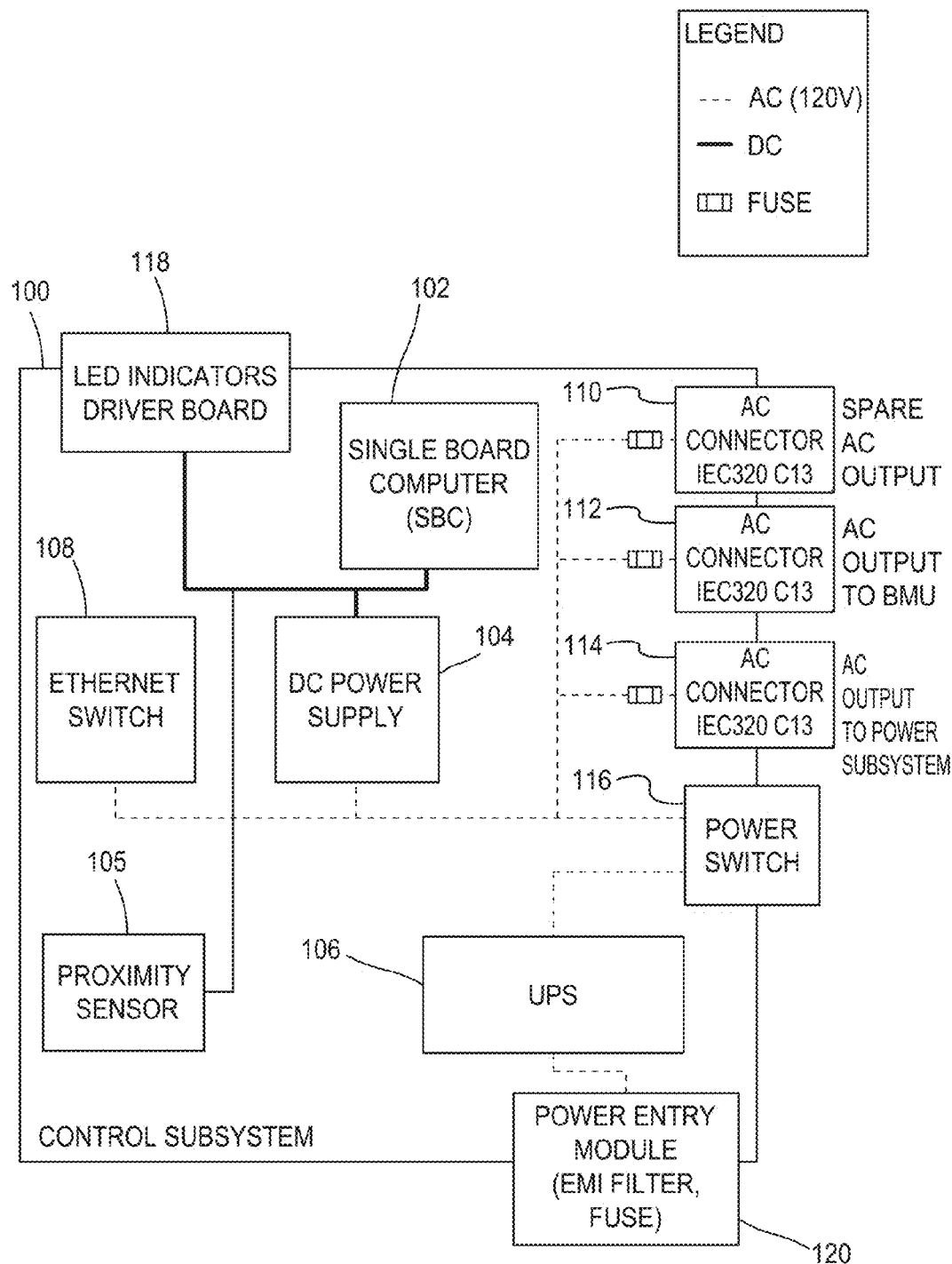
FIG. 6 illustrates a hardware architecture of the control subsystem in accordance with an exemplary embodiment.

As shown in FIGS. 6 and 7, and described above, an exemplary embodiment of a control subsystem 100 includes some or all of: an AC/DC power supply 104; an uninterruptable power supply 106; a processor 102; an Ethernet switch 108; a first communication interface 216 configured to send and/or receive data from the storage subsystem 434; a first transfer interface 112 configured to transmit power to the storage subsystem 434; a second communication interface 218 configured to send and/or receive data from the power subsystem 408; and a second transfer interface 112 configured to transmit power to the power subsystem 408.

In an exemplary embodiment, the processor 102 receives energy storage device data from the storage subsystem 434, and based on information in the received energy storage device data, the processor 102 instructs the power subsystem 408 to charge or discharge the at least one energy storage device 406. The energy storage device data can be, for example, power status, charging/discharging status, energy storage device charge status (e.g., percent of charge), AC contactor status, DC contactor status, fault/error status, etc. The energy storage device data can also include any of the status/performance/health parameters that were described above.

In an exemplary embodiment, the processor 102 of the control subsystem 100 is configured to optimize health and performance of the one or more energy storage devices 406 monitored/managed by the storage subsystem 434 by using the status/health/performance parameters described above.

In an exemplary embodiment, a first electrical device of the at least two electrical devices (for example, electrical devices 140 and 142 in FIG. 2B) can be a first node 410a that includes at least a first control subsystem 100 configured to control transferring of power, a first storage subsystem 434 that stores power in at least one energy storage device 406, and a first power subsystem 408 that converts power. A second electrical device of the at least two electrical devices is a second node 410b that includes at least a second control subsystem 100 configured to control transferring of power, a second storage subsystem 434 that stores power in at least one energy storage device 406, and a second power subsystem 408 that converts power. FIGS. 6 and 7 show exemplary hardware architectures of the control subsystem 100 and will be explained in greater detail below. Also, FIG. 8 shows exemplary hardware architectures of the power subsystem 408, the storage subsystem 404, and the control subsystem, and how these subsystems are interconnected, and will be explained in greater detail below.

In an exemplary embodiment, the device information of the first node 410a is stored in the first control subsystem 100 (i.e., the control subsystem 100 of the first node 410a) and device information of the second node 410b is stored in the second control subsystem 100 (i.e., the control subsystem 100 of the second node 410b).

In an exemplary embodiment, the device information 164 of the first node 410a can include a first preference profile or configuration/characteristics/parameters of the first node 410a and the device information 166 of the second node 410b can include a second preference or configuration/characteristics/parameters profile of the second node 410b. The first preference or configuration/characteristics/parameters profile can include, for example, at least one parameter regarding the at least one energy storage device 406 of the first node 410a and the second preference or configuration/characteristics/parameters profile includes at least one parameter regarding the at least one energy storage device 406 of the second node 410b. For example, each control subsystem 100 of each node can store a preference or configuration/characteristics/parameters profile which includes some or all of the following parameters pertaining to the node the preference or configuration/characteristics/parameters profile is stored in:

optimal charge/discharge rates of the energy storage devices in the node;

most efficient dispatch range of the energy storage devices in the node, possible dispatch range of the energy storage devices, current dispatch range of the energy storage devices, etc.;

efficiency characteristics (e.g. efficiency curve) of the energy storage devices in the node;

current state/status of the node (e.g., whether it is online/offline, the current mode, errors that have occurred and/or are present, etc.);

power subsystem preferred operating temperature (e.g. minimum temperature, maximum temperature, etc.);

preferred battery temperature (e.g. minimum temperature, maximum temperature, etc.);

the maximum efficiency of an inverter in the power subsystem;

history of the energy storage devices in the node (e.g., what have the energy storage devices been doing over a recent time period, etc.);

throughput (e.g., average throughput);

warranty information of the energy storage devices; and life of the components, etc.

In an exemplary embodiment, the first preference or configuration/characteristics/parameters profile can include, for example, optimal charge/discharge rates of the at least one energy storage device 406 in the first node 410a and the second preference or configuration/characteristics/parameters profile includes optimal charge/discharge rates of the at least one energy storage device 406 in the second node 410b.

In an exemplary embodiment, the first preference or configuration/characteristics/parameters profile of the first node 410a can include, for example, a most efficient dispatch range of the at least one energy storage device 406, a possible dispatch range of the at least one energy storage device 406, or a current dispatch range of the at least one energy storage device 406 in the first node 410a and the second preference or configuration/characteristics/parameters profile of the second node 410b includes a most efficient dispatch range of the at least one energy storage device 406, a possible dispatch range of the at least one energy storage device 406, or a current dispatch range of the at least one energy storage device 406 in the second node 410b.

In an exemplary embodiment, the first preference or configuration/characteristics/parameters profile of the first node 410a can include, for example, an efficiency curve of the at least one energy storage device 406 in the first node 410a and the second preference or configuration/characteristics/parameters profile includes an efficiency curve of the at least one energy storage device 406 in the second node 410b.

In an exemplary embodiment, the first preference or configuration/characteristics/parameters profile can include, for example, a cost curve that charts price in relation to amount of power output, of the at least one energy storage device 406 in the first node 410a and the second preference or configuration/characteristics/parameters profile can include, for example, a cost curve, charting price of the power supplied in relation to the amount of power supplied, of the at least one energy storage device 406 in the second node 410b.

In an exemplary embodiment, the first preference or configuration/characteristics/parameters profile can include, for example, a history of the at least one energy storage device 406 in the first node 410a and the second preference or configuration/characteristics/parameters profile can include, for example, a history of the at least one energy storage device 406 in the second node 410b.

In an exemplary embodiment, the first preference or configuration/characteristics/parameters profile can include, for example, warranty information of the at least one energy storage device 406 in the first node 410a and the second preference or configuration/characteristics/parameters profile includes warranty information of the at least one energy storage device 406 in the second node 410b.

In an exemplary embodiment, the first node 410a and the second node 410b are selected by the control device 188, for example, to assemble into a single functional unit based on the first preference or configuration/characteristics/parameters profile and the second preference or configuration/characteristics/parameters profile of each node. For example, nodes can self-assemble into a single unit based on locality, i.e., nodes that are located close to each other can assemble to into one storage unit by pooling the energy storage devices of the nodes together. Also, nodes with similar energy storage device characteristics can self-assemble in to a single unit (e.g., nodes with energy storage devices or power supplies of similar age, type, warranties, usage, power amounts, etc.). Nodes can also assemble based on any other types of characteristics or power needs.

In an exemplary embodiment, the components of the node (the control subsystem 100, the power subsystem 408, and the storage subsystem 434) are configured to be mounted to a rack. However, the components of a node could be located within a container, vessel, etc. and do not need to be mounted to a rack. Also, a node could be comprised of one rack of components or multiple racks of components.

FIG. 4 shows that a node includes one storage subsystem 434, one control subsystem 100, and one power subsystem 408; however, a node could contain any number of subsystems. For example, a node could contain multiple storage subsystems, multiple power subsystems 408, and multiple control subsystems 100. Also, in an exemplary embodiment, the node could include another subsystem other than the control subsystem 100, the storage subsystem 434, and the power subsystem 408, e.g., a reactive power subsystem or a power generation subsystem. In another exemplary embodiment, the node would not include a power subsystem 408 that includes energy storage devices, as a node does not have to include a power subsystem.

In the exemplary embodiment power system of FIG. 4, each node 410a, 410b, and 410c can register itself with a unit control subsystem 420 (which has a same hardware configuration as the control subsystem 100, but is functioning as a control device 188 one level up in the hierarchical structure). The unit control subsystem 420 can then maintain a database of available node control subsystems and their characteristics based on the device information. The unit control subsystem can send instructions to nodes 410a, 410b, and 410c to self-assemble based on the required characteristics that are needed for the assembled power system resulting from the assembly of the node 410a, 410b, and 410c into a functioning unit/system.

Figure 5:
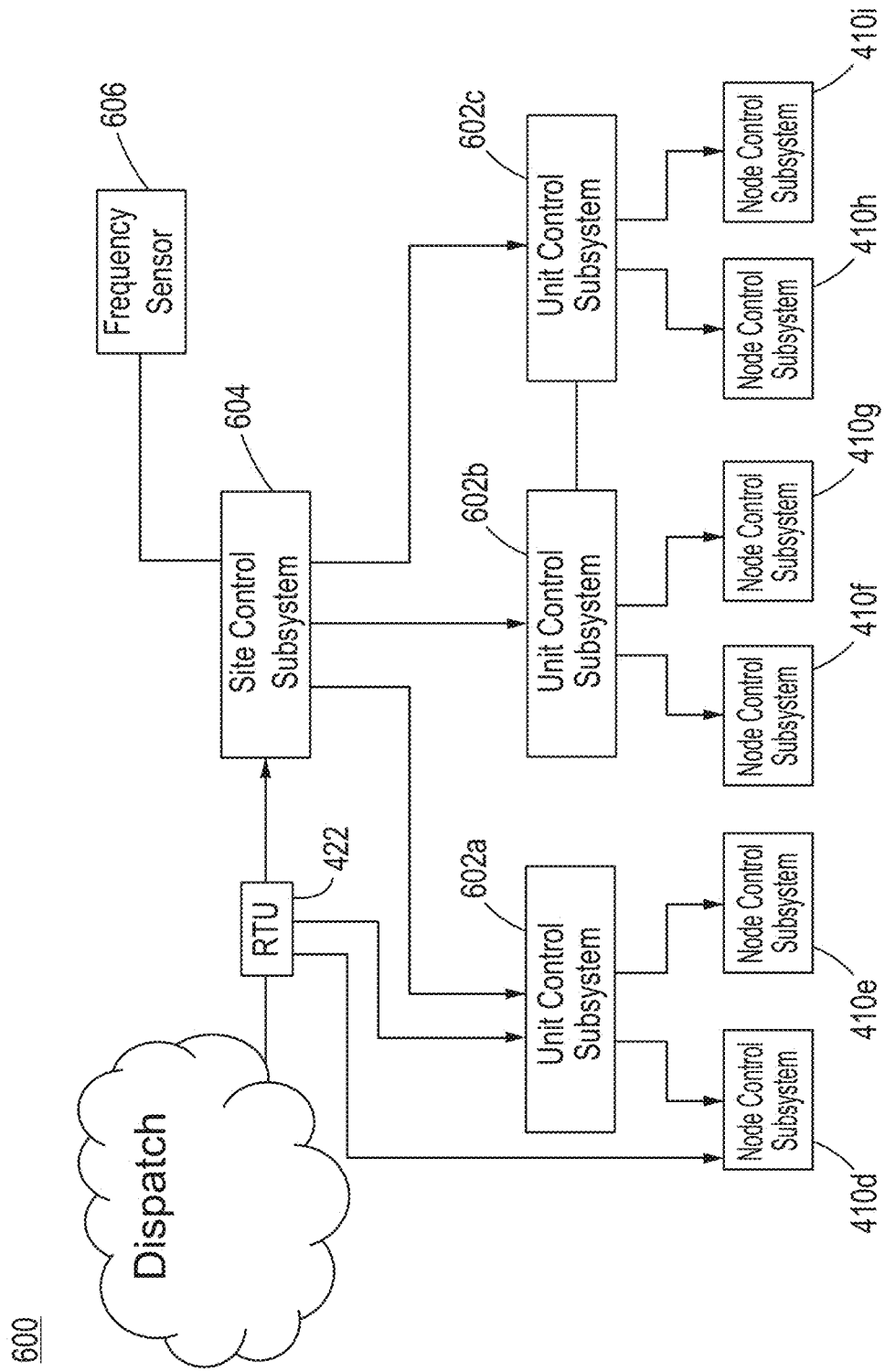
FIG. 5 illustrates a hierarchical architecture of a power system in accordance with an exemplary embodiment.

FIG. 5 illustrates a hierarchical architecture of a power system 600 that includes a plurality of unit control subsystems 602a, 602b, 602c, etc. Each unit control subsystem (for example, unit control subsystem 602a) is connected to multiple node control subsystems 410d and 410e that are control subsystems 100 located in nodes 410a, 410b, 410c. That is, a node control subsystem is a control subsystem 100 that is located in a node. For example, in FIG. 5, the node control subsystem 410d is located in a node that also includes a power subsystem 408, and a storage subsystem 434 including one or more energy storage devices 406. Similarly, node control subsystem 410e is located in another node that also includes a power subsystem 408, and a storage subsystem 434 including one or more energy storage devices 406. The unit control subsystem 602a is connected to the node control subsystems 410d and 410e. Similarly, unit control subsystem 602b is connected to the node control subsystems 410f and 410g. Also, unit control subsystem 602c is connected to the node control subsystems 410d and 410e.

Also, in the power system 600 of FIG. 5, a site control subsystem 604 is connected to each of the plurality of unit control subsystems 602a, 602b, 602c. The site control subsystem 604 can serve an arbitrary number of unit control subsystems. The site control subsystem 604 maintains/monitors the current state and the charge/discharge capacity for all of the nodes at the site, i.e. the power storage facility or portion of the power storage facility.

In FIG. 5, the site control subsystem 604 is configured to monitor a charge/discharge capacity of the plurality of unit control subsystems 602a, 602b, 602c. In addition, the site control subsystem 604 is configured to optimize and/or monitor health and performance of the components in the plurality of unit control subsystems 602a, 602b, 602c (energy storage devices, batteries, inverters, etc.).

The power system 600 of FIG. 5 shows three unit control subsystems 602a, 602b, 602c, but the power system 600 could contain any number of unit control subsystems. The power system 600 of FIG. 5 shows six node control subsystems 410d, 410e, 410f, 410g, 410h, 410i, but the power system 600 could contain any number of node control subsystems. However, due to the hierarchical structure of the power system 600, typically there will be more node control subsystems than unit control subsystems as each unit control subsystem typically monitors more than one node control subsystem. For example, in FIG. 5, each unit control subsystem (e.g. 602a) monitors two node control subsystems (e.g. 410d and 410e). Due to the hierarchical structure of the power system of FIG. 5, the site control subsystem 604, or each site control subsystem 604, is connected to multiple unit control subsystems (e.g. 602a, 602b, 602c), and each unit control subsystem is connected to multiple node control subsystems. In an exemplary embodiment, as shown in FIG. 5, the site control subsystem can be connected to a frequency sensor 606, and the RTU 422 can be connected to the dispatch. The RTU 422 can send signals to the site control subsystem 604, the unit control subsystems 602a, 602b, 602c, etc., and the node control subsystems 410d, 410e, 410f, 410g, 410h, 410i, etc. Data from the frequency sensor 606 can be inputted to the site storage dispatch unit 604, and this data can be used in determining how to dispatch the site in addition to or instead of the dispatch shown in FIG. 5.

In an exemplary embodiment, the power system 600 can be self-registering. That is, each node control subsystem 410 stores a minimum set of information about itself that uniquely identifies and provides necessary device information about the node. In other words, the node knows itself by storing information about itself in the control subsystem 100. The node can then register itself (i.e., it is self-registering) by sending the unique identification information to a unit control subsystem 602, and then up to the site control subsystem 604, etc. The unique identification and device information communicates to the site control subsystem 604 that the node control subsystem that transmitted the information (e.g., identification and device information) is present and available. The site control subsystem 604 can then maintain a database of available node control subsystems.

Similarly, a unit control subsystem 602 also stores characteristics of itself and can register itself with the site control subsystem 604. Sites also store characteristics about themselves and could register themselves with a fleet. Typically, a fleet is a geographical region. It is also possible for fleets to be nested. Similarly, fleets also store information about themselves and can register themselves with an enterprise, which can be the highest level in the hierarchy.

In an exemplary embodiment, the power system 600 can be self-assembling. The power system 600 is self-assembling in the respect that the nodes can decide that they are a unit, and units can decide that they are a site, etc. For example, each control subsystem 100 can store a preference or configuration/characteristics/parameters profile which includes some or all of the following parameters pertaining to the node it is in (the unit control subsystems can also store preference or configuration/characteristics/parameters profiles of multiple nodes it is assigned to monitor/manage and the site control subsystem can store preference or configuration/characteristics/parameters profiles of a combined grouping of nodes that are monitored/managed by a unit control subsystem):

optimal charge/discharge rates of the energy storage devices in the node;

most efficient dispatch range of the energy storage devices, possible dispatch range of the energy storage devices, current dispatch range of the energy storage devices, etc.;

efficiency curve of the energy storage devices;

current state/status of the node (e.g., whether it is online/offline, the current mode, errors that have occurred and/or are present, etc.);

power subsystem preferred operating temperature (e.g. minimum temperature, maximum temperature, etc.);

preferred energy storage device temperature (e.g. minimum temperature, maximum temperature, etc.);

the maximum efficiency of the inverter;

history of the energy storage devices (e.g., what have the batteries been doing over a recent time period, etc.);

throughput (e.g., average throughput);

warranty information of the energy storage devices; and life of the components, etc.

A plurality of nodes can then self-assemble to create a unit based on the required parameters of the system. Also, the site control subsystem 604 can select a specific grouping of nodes monitored by a particular unit control subsystem or select multiple groups of nodes monitored by two or more unit control subsystems based on the preference or configuration/characteristics/parameters profiles of the nodes in order to obtain the required power characteristics that are required for the system.

In an exemplary embodiment, preference or configuration/characteristics/parameters profile parameters described above could be weighted differently so that some parameters are deemed more important than others when selecting a node based upon its preference or configuration/characteristics/parameters profile. For example, when a certain amount of power is needed, the site control subsystem 604 can start a bidding process by looking at the preference or configuration/characteristics/parameters profiles of the multiple nodes in the system and select a node or a grouping of multiple nodes based on the power needed. For example, nodes can be selected that provide the cheapest amount of power. It is also possible that the selected nodes can be nodes which contain batteries/energy storage devices that are just about to go out of warranty, nodes that are operating at maximum efficiency on their efficiency curve, nodes that are located close to each other (i.e., locality), etc.

FIG. 5 is an exemplary embodiment of a power system 600 that can be self-registering and self-assembling. That is, each node control subsystem 410 stores a minimum set of information about itself that uniquely identifies the node and its characteristics. In other words, the node knows itself by storing information about itself in the control subsystem 100. The node control subsystems 410d, 410e, 410f, 410g, 410h, 410i, shown in FIG. 5 can each be one of the nodes shown in FIG. 4 (e.g., 410a). Each node control subsystem 410d, 410e, 410f, 410g, 410h, 410i can then register itself by sending the unique identification information to a unit control subsystem 602 (which is up a level in the hierarchy), and then up to a site control subsystem 604 (which has a same hardware configuration as the control subsystem 100, but is functioning as a control device 188 two levels up in the hierarchical structure), etc. The unique identification information lets the site control subsystem 604 know that the node control subsystem that transmitted the information (e.g., identification information) is present and available. The site control subsystem 604 can then maintain a database of available node control subsystems and characteristics of the node control subsystems based on device information including a preference or configuration/characteristics/parameters profile.

Similarly, a unit control subsystem 602 also knows characteristics of itself and can register itself with the site control subsystem 604. Sites also know themselves and could register themselves with a fleet. Typically, a fleet is a geographical region. It is also possible for fleets to be nested. Similarly, fleets also know themselves and can register themselves with an enterprise, which can be the highest level in the hierarchy.

In an exemplary embodiment, as mentioned above, the power system 600 can be self-assembling. The power system 600 is self-assembling in the respect that the nodes can decide that they are a unit, and units can decide that they are a site, etc. For example, each control subsystem 100 can store a preference or configuration/characteristics/parameters profile as described above which can include multiple parameters pertaining to the node it is in (the unit control subsystems can also store preference or configuration/characteristics/parameters profiles of multiple nodes it is assigned to monitor/manage and the site control subsystem can store preference or configuration/characteristics/parameters profiles of a combined grouping of nodes that are monitored/managed by a unit control subsystem).

A plurality of nodes can then self-assemble to create a unit based on the required parameters of the system. Also, the site control subsystem 604 can select a specific grouping of nodes monitored by a particular unit control subsystem or select multiple groups of nodes monitored by two or more unit control 7 subsystems based on the preference or configuration/characteristics/parameters profiles of the nodes in order to obtain the required power characteristics that are required for the system.

In an exemplary embodiment, preference profile parameters described above could be weighted differently so that some parameters are deemed more important than others when selecting a node based upon its preference or configuration/characteristics/parameters profile. For example, when a certain amount of power is needed, the site control subsystem 604 can start a bidding process by looking at the preference or configuration/characteristics/parameters profiles of the multiple nodes in the system and select a node or a grouping of multiple nodes based on the power needed. For example, nodes can be selected that provide the cheapest amount of power. It is also possible that the selected nodes can be nodes which contain batteries/energy storage devices that are just about to go out of warranty, nodes that are operating at maximum efficiency on their efficiency curve, nodes that are located close to each other (i.e., locality), etc.

In an exemplary embodiment, each node can contain individual software, and upon self-assembly to create a unit, the individual software of each node is combined to create a combined software program that can control all of the racks in the unit. Alternatively, one node in the unit can contain the software that is used to control all of the nodes of an assembled unit.

FIGS. 6 and 7 are exemplary embodiments of a hardware architecture of the control subsystem 100. The control subsystem 100 is a control unit that interfaces with the power subsystem 408 and the storage subsystem 434 that includes an energy storage device unit/battery management unit 404 and at least one energy storage device 406. The control subsystem 100, the power subsystem 408, and the storage subsystem 434 comprise a power unit called a node 410, as described above. The control subsystem 100 can send signals to the power subsystem 408 and the energy storage device unit/battery management unit 404 which bring about the charging or discharging of an energy storage device or energy storage devices 406 by components in the power subsystem 408. The energy storage device unit/battery management unit 404 can connect and disconnect the energy storage devices 406 in the storage subsystem 434. The control subsystem 100 can monitor/manage the current state, health (e.g. long-term and short-term), and/or performance (e.g. long-term and short-term) of the energy storage devices and/or other components in the power storage system. The current state and health parameters will be discussed in greater detail later.

FIG. 6 shows the control subsystem 100, and the electrical connections of various components located within the control subsystem 100. As shown in the legend of FIG. 6, a broken line denotes an alternating current (AC) line of, for example 120V. It is possible that the AC voltage could be any other voltage than 120V. Also, in FIG. 6, a solid line denotes a direct current (DC) line. It is possible for AC lines to instead be DC lines, and for the DC lines to instead be AC lines. It is also possible for all of the lines in FIG. 6 to be all AC lines or all DC lines, or any combination of AC lines and DC lines.

The control subsystem 100 is configured to control transferring of power. The control subsystem 100 includes: an AC/DC power supply 104 (e.g., a DC power supply as in FIG. 6); an uninterruptable power supply (UPS) 106; a processor 102; an Ethernet switch 108; a power switch 116; and a power entry module 120 (EMI filter, fuse, etc.). The processor 102 could be any type of computer processor, including a single board computer, etc. For example, the processor 102 can be a single processor, a plurality of processors, or combinations thereof. The processor 102 may have one or more processor "cores." The single board computer can be, for example, a Raspberry Pi single board computer. The single board computer can include, for example, a 32-bit processor with an ARM or x86 core architecture. In an exemplary embodiment, the single board computer can use a MathWorks, Inc. embedded code supported processor. In an exemplary embodiment, the single board computer can include a memory having a capacity of 512 MB or more. Alternatively, the storage capacity of the memory of the single board computer can be any size. The memory could be a RAM, ROM, etc. In an exemplary embodiment, the software of the control subsystem 100 can be stored outside of the control subsystem 100.

The Ethernet switch 108 can be, for example, a 10/100 Mbps or faster Ethernet controller. The Ethernet switch 108 can have any number of ports, for example, at least five ports. A first port for the single board computer 102, a second port for the uninterruptable power supply 106, a third port for the energy storage device unit/battery management unit 404 located in the storage subsystem 434, a fourth port for the power subsystem 408, and a fifth port for an upstream network connection.

The control subsystem 100 also includes a first communication interface 216 configured to send and/or receive data from a storage subsystem 434 that monitors one or more energy storage devices/batteries 406 that are removable and chargeable.

The batteries can be any type of battery, including rechargeable batteries (e.g., flow battery, fuel cell, lead-acid, lithium air, lithium-ion, molten salt, nickel-cadmium (NiCd), nickel hydrogen, nickel-iron, nickel metal hydride, nickel-zinc, organic radical, polymer-based, polysulfide bromide, potassium-ion, rechargeable alkaline, silicon air, sodium-ion, sodium-sulfur, super iron, zinc-bromine, zinc matrix, etc.) and/or non-rechargeable batteries (e.g., alkaline, aluminum-air, atomic, Bunsen cell, chromic acid cell, Clark cell, Daniell cell, dry cell, earth, frog, galvanic cell, grove cell, Leclanche cell, lemon, lithium, lithium air, mercury, molten salt, nickel oxyhydroxide, organic radical, paper, potato, Pulvermacher's chain, reserve, silver-oxide, solid-state, voltaic, water-activated, Weston cell, zinc-air, zinc-carbon, zinc chloride, etc.). The storage subsystem 434 can include only one type of energy storage device or a combination of different types of energy storage devices.

The first communication interface 216 can be, for example, a RJ-45 connector as shown in FIG. 7. The first communication interface can also be any other type of data connector and may consist of one or more connectors.

The control subsystem 100 also includes a first transfer interface 112 configured to transmit power to the energy storage device unit/battery management unit 404. The first transfer interface 112 can be, for example, an AC connector IEC320 C13 as shown in FIG. 6. The first transfer interface 112 can also be any other type of data connector and may include one or more connectors.

The control subsystem 100 also includes a second communication interface 218 configured to send and/or receive data from a power subsystem 408. The second communication interface 218 can be, for example, a RJ-45 connector as shown in FIG. 7. The second communication interface 218 can also be any other type of data connector and may include one or more connectors. The control subsystem 100 also includes a spare AC output connector 110 which can be, for example, an AC connector IEC320 C13. The power subsystem 408, shown in FIG. 8, includes a power converter 416, and the power subsystem 408 is configured to be connected to a power line. The power converter 416 can be an AC or DC inverter, the inverter has the ability to connect or disconnect itself. An exemplary embodiment of the power subsystem 408 is shown in FIG. 8. In addition to the power converter 416, the power subsystem 408 can include, for example, at least one sensor 802, at least one processor 804, at least one breaker 806, at least one capacitor 808, at least one memory 810, at least one fuse 812, and at least one contactor 814.

The control subsystem 100 of FIG. 6 also includes a second transfer interface 114 that is configured to transmit power to the power subsystem 408. The second transfer interface 114 can be, for example, an AC connector IEC320 C13 as shown in FIG. 6. The second transfer interface 114 can also be any other type of data connector and may include one or more connectors. In an exemplary embodiment, one or more of the first transfer interface 112, the second transfer interface 114, and the spare AC output connector 110 may not be powered by the uninterruptable power supply 106.

The processor 102 is configured to send signals which control the charging and discharging of at least one energy storage device 406 in the storage subsystem 434. The control subsystem 100 is used to coordinate power transfer between the storage subsystem 434 and the power subsystem 408. The power subsystem 408 is responsible for pulling power from the grid and transferring it to the energy storage device or energy storage devices 406. The power system 408 can also pull power from the energy storage device or energy storage devices and transfer it to the grid.

The uninterruptable power supply 106, shown in FIG. 6, provides temporary 120V AC power in the event of disconnection of the control subsystem 100 from facility power lines. The uninterruptable power supply 106 can supply, for example, 250 W at 120V AC, under both a normal state (i.e., external 120V AC available) and a power loss state (i.e., no external 120V AC available, running from batteries or energy storage devices). The uninterruptable power supply 106 can supply temporary power at any other voltage or power level. As shown in FIG. 8, the uninterruptable power supply 106 can provide power to the power subsystem 408 module and to an energy storage device unit/battery management unit (BMU) 404 (i.e. a computer processor) of the power subsystem 434. The energy storage device unit/battery management unit 404 tells the power subsystem 408 when it can charge or discharge the energy storage device or energy storage device 406. The uninterruptable power supply 106 can, for example, have sufficient capacity to provide at least five minutes of 120V AC, 250 W output operation under power loss conditions. The uninterruptable power supply 106 can also include protective devices (fuses, breakers, etc.) for each 120V AC output terminal of the uninterruptable power supply 106.

The AC/DC power supply 104 provides power to the components of the control subsystem 100 and is sized to provide continuous operation of the components. The control subsystem 100 is used to coordinate interactions between the storage subsystem 434 and the power subsystem 408, and to control overall operational functions of a node 410a, 410b, 410c, etc. including charging, discharging, DC idle, safe shutdown, and emergency modes.

In an exemplary embodiment, the processor 102 is configured to optimize health and performance of the one or more energy storage devices 406 (e.g., batteries, capacitors, etc.) in the storage subsystem 434. The health and performance of the one or more energy storage devices 406 can be long-term health and performance or short-term health and performance. Parameters that indicate the current status, the performance, or the short-term/long-term health of the energy storage devices, may include all or some of the following:

current state/status of the node 410 (e.g., whether it is online/offline, the current mode, errors that have occurred and/or are present, etc.); power subsystem 408 temperature (e.g. minimum temperature, maximum temperature, average minimum temperature, average maximum temperature, etc.);

power subsystem 408 temperature exposure (e.g. number of times of X degrees for Y amount of time, etc.);

energy storage device temperature (e.g. minimum temperature, maximum temperature, average minimum temperature, average maximum temperature, etc.);

energy storage device temperature exposure (e.g. number of times of X degrees for Y amount of time, etc.);

age of the energy storage devices (e.g. average age of the batteries, etc.);

most efficient dispatch range of the energy storage devices, possible dispatch range of the energy storage devices, current dispatch range of the energy storage devices, etc.;

state of charge (SoC) of the energy storage devices (e.g., average SoC);

throughput (e.g., average throughput);

capacity (e.g. charge/discharge);

time since last dispatch;

cell voltage (e.g., minimum and/or maximum at the rack level, etc.);

charge rate (C-rate);

full cycle equivalents number;

warranty information of the energy storage devices;

efficiency curve of the energy storage devices;

the maximum efficiency of the inverter; and life of the components, etc.

Some or all of the above status/health parameters can be used to optimize performance and/or health of the batteries and/or energy storage devices. In an exemplary embodiment, the processor 102 is configured to monitor an operational status of the one or more energy storage devices 406. The operational status could indicate a fault, charging of the storage subsystem 434, discharging of the storage subsystem 434, percentage of power available, etc.

FIG. 7 shows the control subsystem 100, and the data connections of various components located within the control subsystem 100. In FIG. 7, the USB connector 220 is connected to USB host 210 in the single board computer 102 via a USB connection. The single board computer 102 also includes a digital I/O module 208 that is connected to an LED driver board 118 via a digital I/O connection. The LED driver board 118 controls LED indicators 222 which output status information regarding the control subsystem 100 and/or the node 410a. In an exemplary embodiment, the total power required during normal operation and during power up by the control subsystem 100 is less than 80 W. In another exemplary embodiment, the control subsystem 100 is able to perform a power cycle of the uninterruptable power supply 106 output.

FIG. 7 also shows a USB module 204 that is connected to the uninterruptable power supply 106 via a USB connection. The single board computer 102 also includes an Ethernet controller 206 that is connected (for example via an Ethernet connection) to an Ethernet switch 108 that is located outside of the single board computer or processor 102. The Ethernet switch 108 is connected to each of the connectors 214, 216, and 218 via separate Ethernet lines.

In an exemplary embodiment, the control subsystem 100 includes a port that allows the processor 102 to be programmed or reprogrammed. For example, the port could be a USB port 220 (USB 2.0, USB 3.0, etc.) as shown in FIG. 7. The port can be any other data port that receives and/or transmits data, e.g., RS-232, Ethernet port, etc. Instead of a physical port 220 or in addition to the physical port 220, the processor 102 could be programmed or reprogrammed remotely via Wi-Fi, NFC, etc.

In an exemplary embodiment, the control subsystem 100 includes an SD card interface 212 configured to accept an SD card. The interface 212 could instead accept an SDHC or a micro SD card, etc. The SD card preferably stores 4 GB or more of data. The single board computer 102 could include any other type of memory device (RAM, ROM, hard drive, optical drive, etc.) other than the SD card interface 212 and the SD card.

The exemplary control subsystem 100 of FIG. 7 can also include a USB hub 224 that is connected to the USB-A connector 220, the UPS 106, the LED driver board 118, and the USB module 204 via USB connections. The digital I/O and USB connections shown in FIG. 7 are interchangeable.

FIG. 8 illustrates how the various components that make up a node (control subsystem 100, the power subsystem 408, and the storage subsystem 434) can be connected to each other. In FIG. 8, the protocols shown in the legend are exemplary. In FIG. 8, the control subsystem 100 is connected to the power subsystem 408 via three connections, for example. Two of the connections are 120V AC connections and one of the connections is an Ethernet connection that connects the Ethernet switch 108 of the control subsystem 100 to the inverter controller 416 of the power subsystem 408. One of the 120V AC connections is a connection between the uninterruptable power supply 106 and a 400V/120V transformer contained in the power subsystem 408. In addition to the transformer, the power subsystem 408 includes an AC contactor, and IGBT bridge and an inverter controller 416. In an exemplary embodiment, power to the uninterruptable power supply 106 does not have to come from the power subsystem 408.

The power subsystem 408 is connected to the storage subsystem 434 via two DC connections. The storage subsystem 434 also includes a DC contactor, a pre-charge relay, an energy storage device unit/battery management unit 404 (e.g. a computer processor), and an externally-accessible fuse/breaker. The power subsystem 408 is connected to the energy storage devices 406 via DC connections. The power subsystem 408 can also be connected to one or more rack fans that are used to cool down the components if they are stored in a rack.

FIG. 8 also shows that the control subsystem 100 is connected to the storage subsystem 434 via an Ethernet connection. Specifically, the Ethernet switch 108 is connected to the energy storage device unit/battery management unit 404 of the storage subsystem 434. FIG. 8 also shows an emergency stop input line to which an emergency stop push-button switch can be connected. The emergency stop push-button switch can be mounted to an accessible location, and when it is pressed, causes power sources to be disconnected. For example, the power subsystem 408 can be disconnected from the storage subsystem 434 and from the energy storage facility AC bus.

While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for self-registration and/or self-assembly of a plurality of electrical devices, the method comprising:
   performing the self-registration of the plurality of electrical devices by sending, from each of the plurality of electrical devices, device information that is stored in each of the plurality of electrical devices to a control device, including a processor, via a network, wherein the device information of each device identifies unique characteristics of the device the device information is stored in;
   receiving, in the control device, the device information sent from each of the plurality of electrical devices;
   storing, in a memory of the control device, the device information of each of the plurality of electrical devices; and
   determining, from the stored device information of each of the plurality of electrical devices that each of the plurality of electrical devices are present and available on the network,
   wherein the plurality of electrical devices are devices for charging and discharging electrical power.

2. The method for self-registration and/or self-assembly of a plurality of electrical devices of claim 1, further comprising:
   selecting, by the control device, at least two electrical devices among the plurality of electrical devices based on each of the two electrical device's characteristics;
   transmitting instructions, from the control device to the at least two electrical devices, instructing the at least two electrical devices to assemble into a functional unit; and
   assembling the at least two electrical devices into the functional unit.

3. The method for self-registration and/or self-assembly of a plurality of electrical devices of claim 1, wherein the plurality of electrical devices are devices for storing or managing electrical power.

4. The method for self-registration and/or self-assembly of a plurality of electrical devices of claim 2, wherein a first electrical device of the at least two electrical devices is a first node that includes at least a first control subsystem configured to control transferring of power, a first storage subsystem that stores power in at least one energy storage device, and a first power subsystem that converts power, and a second electrical device of the at least two electrical devices is a second node that includes at least a second control subsystem configured to control transferring of power, a second storage subsystem that stores power in at least one energy storage device, and a second power subsystem that converts power.

5. The method for self-registration and/or self-assembly of a plurality of electrical devices of claim 4, wherein device information of the first node is stored in the first control subsystem and device information of the second node is stored in the second control subsystem.

6. The method for self-registration and/or self-assembly of a plurality of electrical devices of claim 5, wherein the device information of the first node includes a first preference or configuration/characteristics/parameters profile of the first node and the device information of the second node includes a second preference or configuration/characteristics/parameters profile of the second node.

7. The method for self-registration and/or self-assembly of a plurality of electrical devices of claim 6, wherein the first preference or configuration/characteristics/parameters profile includes at least one parameter regarding the at least one energy storage device of the first node and the second preference or configuration/characteristics/parameters profile includes at least one parameter regarding the at least one energy storage device of the second node.

8. The method for self-registration and/or self-assembly of a plurality of electrical devices of claim 7, wherein the first node and the second node are selected to assemble into a functional unit based on the first preference or configuration/characteristics/parameters profile and the second preference or configuration/characteristics/parameters profile.

9. The method for self-registration and/or self-assembly of a plurality of electrical devices of claim 7, wherein the first preference or configuration/characteristics/parameters profile includes optimal charge/discharge rates of the at least one energy storage device in the first node and the second preference or configuration/characteristics/parameters profile includes optimal charge/discharge rates of the at least one energy storage device in the second node.

10. The method for self-registration and/or self-assembly of a plurality of electrical devices of claim 7, wherein the first preference or configuration/characteristics/parameters profile includes a most efficient dispatch range of the at least one energy storage device, a possible dispatch range of the at least one energy storage device, or a current dispatch range of the at least one energy storage device in the first node and the second preference or configuration/characteristics/parameters profile includes a most efficient dispatch range of the at least one energy storage device, a possible dispatch range of the at least one energy storage device, or a current dispatch range of the at least one energy storage device in the second node.

11. The method for self-registration and/or self-assembly of a plurality of electrical devices of claim 7, wherein the first preference or configuration/characteristics/parameters profile includes efficiency characteristics of the at least one energy storage device in the first node and the second preference or configuration/characteristics/parameters profile includes efficiency characteristics of the at least one energy storage device in the second node.

12. The method for self-registration and/or self-assembly of a plurality of electrical devices of claim 7, wherein the first preference or configuration/characteristics/parameters profile includes a cost curve, charting price in relation to power output, of the at least one energy storage device in the first node and the second preference or configuration/characteristics/parameters profile includes a cost curve, charting price in relation to power output, of the at least one energy storage device in the second node.

13. The method for self-registration and/or self-assembly of a plurality of electrical devices of claim 7, wherein the first preference or configuration/characteristics/parameters profile includes a history of the at least one energy storage device in the first node and the second preference or configuration/characteristics/parameters profile includes a history of the at least one energy storage device in the second node.

14. The method for self-registration and/or self-assembly of a plurality of electrical devices of claim 7, wherein the first preference or configuration/characteristics/parameters profile includes warranty information of the at least one energy storage device in the first node and the second preference or configuration/characteristics/parameters profile includes warranty information of the at least one energy storage device in the second node.

15. The method for self-registration and/or self-assembly of a plurality of electrical devices of claim 4, wherein the first and/or second control subsystem includes:
   an AC/DC power supply;
   an uninterruptable power supply;
   a processor;
   an Ethernet switch;
   a first communication interface configured to send and/or receive data from a storage subsystem that monitors one or more energy storage devices (406) that are removable and chargeable;
   a first transfer interface configured to transmit power to the storage subsystem;
   a second communication interface configured to send and/or receive data from a power subsystem that includes a power converter, and the power subsystem is configured to be connected to a power line; and
   a second transfer interface configured to transmit power to the power subsystem,
   wherein the processor is configured to send signals which control the charging and discharging of at least one energy storage device of the one or more energy storage devices in the storage subsystem.

16. The method for self-registration and/or self-assembly of a plurality of electrical devices of claim 1, wherein one electrical device of the plurality of electrical devices is a storage subsystem that stores power.

17. The method for self-registration and/or self-assembly of a plurality of electrical devices of claim 16, wherein the storage subsystem includes one or more energy storage devices which are removable and chargeable, and a processor that is configured to monitor at least one energy storage device of the one or more energy storage devices.

18. The method for self-registration and/or self-assembly of a plurality of electrical devices of claim 1, wherein one electrical device of the plurality of electrical devices is a power subsystem that converts power.

19. The method for self-registration and/or self-assembly of a plurality of electrical devices of claim 18, wherein the power subsystem includes a power converter which converts AC power to DC power when at least one energy storage device is being charged, and converts DC power to AC power when the at least one energy storage device is being discharged.

20. The method for self-registration and/or self-assembly of a plurality of electrical devices of claim 1, wherein at least one electrical device among the plurality of electrical devices that are registered are deregistered.

21. The method for self-registration and/or self-assembly of a plurality of electrical devices of claim 1, wherein the at least two assembled electrical devices are organized in a hierarchical manner.

22. The method for self-registration and/or self-assembly of a plurality of electrical devices of claim 1, wherein after the plurality of electrical devices are self-registered,
   forming a first group of electrical devices among the plurality of electrical devices based on a first characteristic that is shared by the first group of electrical devices, and
   forming a second group of electrical devices among the plurality of electrical devices based on a second characteristic that is shared by the second group of electrical devices.

23. The method for self-registration and/or self-assembly of a plurality of electrical devices of claim 22, further comprising:
   using either the first group of electrical devices or the second group of electrical devices based on whether the first characteristic or the second characteristic is desired.

24. The method for self-registration and/or self-assembly of a plurality of electrical devices of claim 22, further comprising:
   receiving stored energy from either the first group of electrical devices or the second group of electrical devices based on whether the first characteristic or the second characteristic is desired.

25. The method for self-registration and/or self-assembly of a plurality of electrical devices of claim 1, wherein the control device is at least one of the plurality of electrical devices.

26. A method for self-registration and/or self-assembly of a plurality of electrical devices, the method comprising:
   performing the self-registration of the plurality of electrical devices, with control logic distributed among more than two of the plurality of electrical devices, by determining which of the plurality of electrical devices are present and available; and
   instructing, by the control logic, at least two electrical devices that are determined to be present and available to assemble into a functional unit,
   wherein the plurality of electrical devices are devices for charging and discharging electrical power.

* * * * *